United States Patent [19]
Dang et al.

[11] Patent Number: 5,612,934
[45] Date of Patent: Mar. 18, 1997

[54] RECORD MEDIA LIBRARY ACCESSING USING A COMMON ACCESSING MECHANISM FOR A PLURALITY OF INDEPENDENT MEDIA LIBRARIES

[75] Inventors: Chi-Hung Dang; Chi-Thanh Dang, both of Tucson, Ariz.

[73] Assignee: International Business Machines Corporation, Armonk, N.Y.

[21] Appl. No.: 330,944

[22] Filed: Oct. 28, 1994

[51] Int. Cl.⁶ .......................... G11B 17/04; G11B 17/22
[52] U.S. Cl. ..................... 369/36; 369/192; 360/92
[58] Field of Search .................... 369/34, 36, 38, 369/178, 191, 192; 360/92

[56] References Cited

U.S. PATENT DOCUMENTS

| | | | |
|---|---|---|---|
| 4,614,474 | 9/1986 | Sudo | 369/178 |
| 4,757,401 | 7/1988 | Teranishi | 369/34 |
| 5,036,503 | 7/1991 | Tomita | 360/92 |
| 5,278,708 | 1/1994 | Apple et al. | 360/92 |
| 5,303,214 | 4/1994 | Kulakowski et al. | 369/34 |
| 5,429,470 | 7/1995 | Nicol et al. | 360/92 |
| 5,481,514 | 1/1996 | Yamasaki et al. | 369/36 |

FOREIGN PATENT DOCUMENTS 8502051  5/1985  WIPO ........................... 360/92

*Primary Examiner*—Stuart S. Levy
*Assistant Examiner*—William R. Korzuch
*Attorney, Agent, or Firm*—D. A. Shifrin; H. F. Somermeyer

[57] ABSTRACT

A single accessing mechanism is deployed adjacently to two optical media libraries. Each library has a plurality of record medium storage compartments arranged respectively into a one-compartment wide column. Each library has its own media drive (player or recorder). An accessing module in the accessing mechanism is movable along the column lengths. The accessing module has two transfer compartments respectively for transferring record media in respective ones of said libraries between the respective storage compartments and the respective media drives. The compartments, either in the accessing module or the library, are vertically offset. A vertical space between vertically adjacent record media enables a fetching apparatus to simultaneously enter such space in both libraries. Moving the accessing module upward or downward respectively selects the record medium to be fetched—in only one of the two libraries.

15 Claims, 5 Drawing Sheets

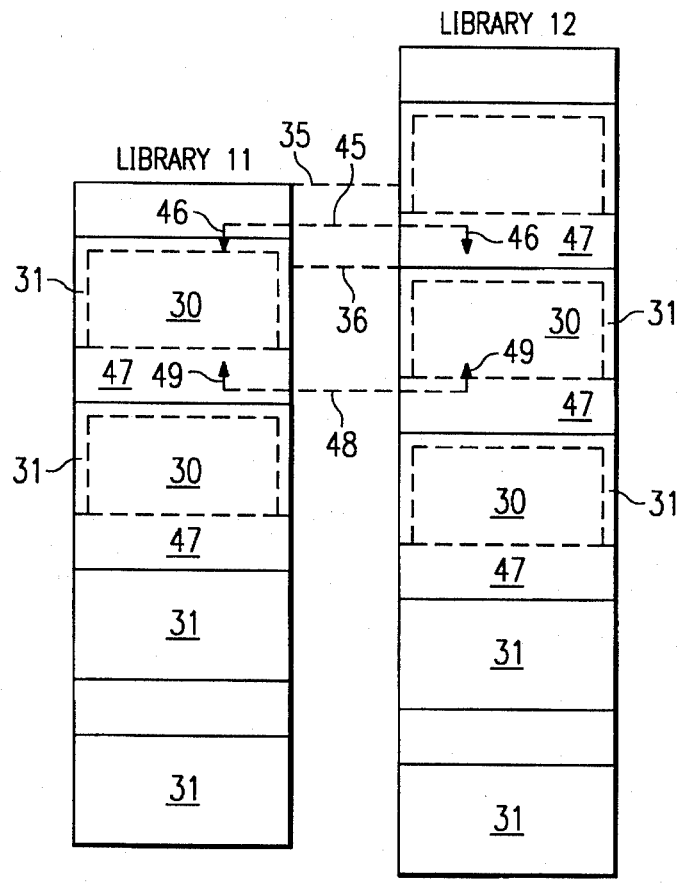

FIG. 2

FETCH RECORD MEDIUM

- MOVE ACCESSING MODULE TO POSITION ABOVE ACCESS OPENING IN WHICH RECORD MEDIUM IS LOCATED —120
- EXTEND FETCHING APPARATUS TO BE ABOVE ACCESS OPENING —121
- LOWER ACCESSING MODULE FOR ENGAGING PINS 52 & 53 WITH RECORD MEDIUM —122
- RETRACT FETCHING APPARATUS INTO ACCESSING MODULE AND ENGAGED RECORD MEDIUM INTO ONE OF THE TRANSFER COMPARTMENTS —123

FIG. 10

STORE RECORD MEDIUM

- MOVE ACCESSING MODULE TO BE ALIGNED WITH DESIRED ACCESS OPENING IN WHICH RECORD MEDIUM IS TO BE INSERTED —125
- EXTEND FETCHING APPARATUS TO MOVE RECORD MEDIUM FROM TRANSFER COMPARTMENT INTO DESIRED ACCESS OPENING —126
- RAISE ACCESSING MODULE TO FREE PINS 52 & 53 FROM RECORD MEDIUM —127
- RETRACT FETCHING APPARATUS INTO ACCESSING MODULE —128

FIG. 11

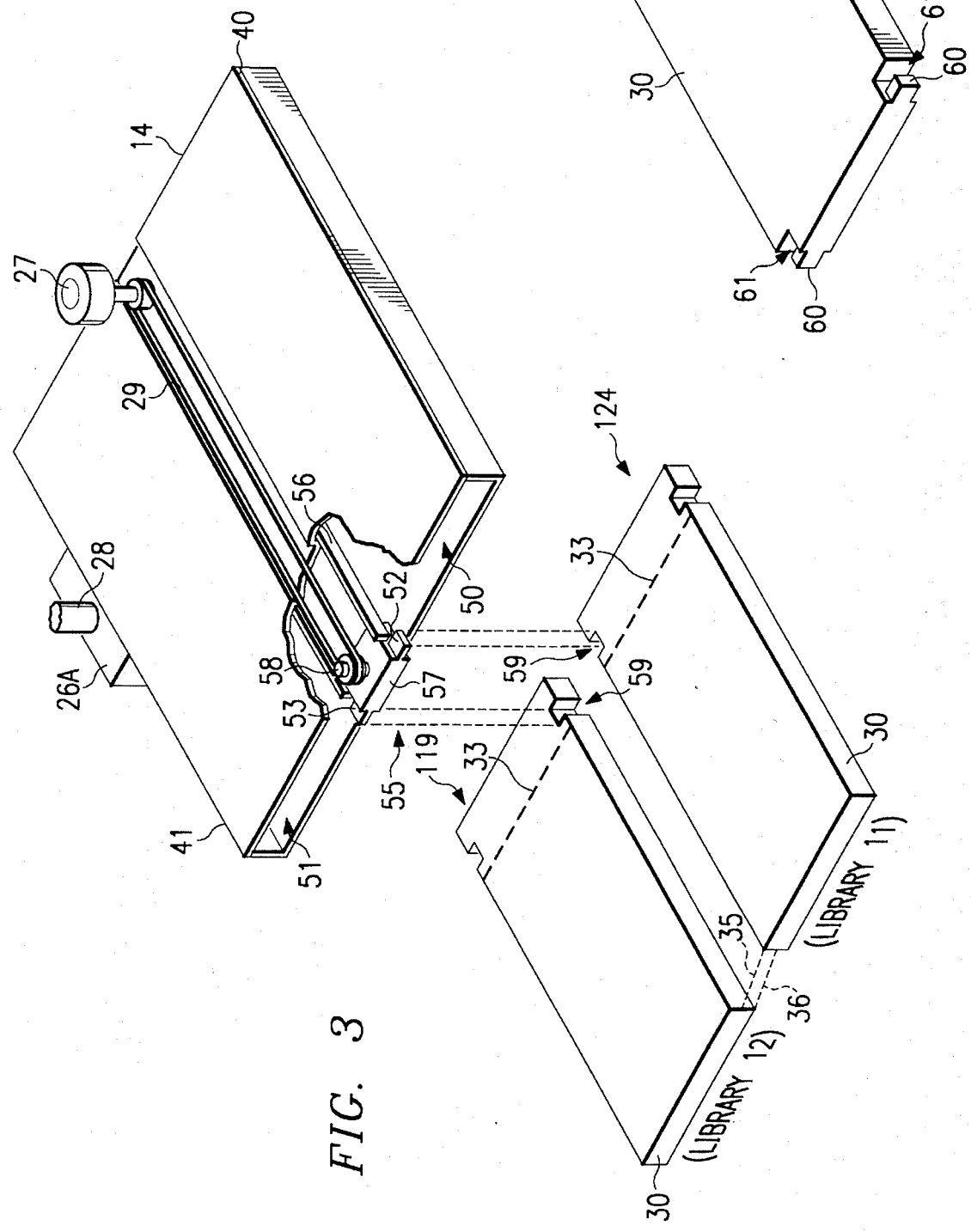

RECORD MEDIA LIBRARY ACCESSING USING A COMMON ACCESSING MECHANISM FOR A PLURALITY OF INDEPENDENT MEDIA LIBRARIES

FIELD OF THE INVENTION

This application relates to record media libraries, more particularly to a plurality of record media libraries service by a common accessing mechanism that prevents record media from migrating from one library to another library.

BACKGROUND OF THE INVENTION

Media libraries often use so-called travelling elevators as accessing mechanisms for transferring record media (tape, disks, cards etc. that preferably are in a housing) between any one of a plurality of media storage compartments (also termed receptacles) and media devices (also termed players or recorders). Such travelling elevators consist of a horizontally movable carriage disposed for movement along an open face of an array of media compartments. Each compartment has an access opening facing the carriage. A vertically movable elevator is mounted on the carriage for carrying a media holder vertically of the array. In this manner, any one of the media compartments in the array can be accessed. One or more media drives are usually disposed within the array such that the accessing mechanism can transfer record media between the media drives and the media storage compartments. An example of such a library is shown by Kulakowski et al in U.S. Pat. No. 5,303,214.

A problem with the travelling-elevator access mechanisms is high cost of construction and operation. It is desired to provide low-cost efficient small size media libraries that enable a low cost accessing mechanism that may serve multiple library operational requirements. Such operational requirements include accessing media storage compartments, multi-record-media accessing and library input-output (IO) operations of inserting and removing record media into and from a record media library. Simplifying design also tends to improve reliability of library operations.

SUMMARY OF THE INVENTION

The present invention provides a low-cost multi-library configuration and operation enabling one accessing mechanism to transfer record media between media storage compartments and media drives in any one of a plurality of libraries without co-mingling media between the libraries and serve as an independent input-output station for each of the libraries. Each library may store a different type of media.

In accordance with one aspect of the invention, one accessing mechanism provides independent access to any one of a plurality of media libraries through an independent media accessing compartment in the accessing mechanism for each of the libraries. A preferred arrangement includes limiting motion of the accessing mechanism such that the relative motions of the accessing compartments are limited to respective libraries. Each media library includes a plurality of media storage compartments and a media drive. Input-output of media to and from each library is via respective media accessing compartments. Access to each of the media accessing compartments in an area remote from the media storage compartments enables such input-output.

In a preferred form of the invention, each library comprises a one-media-storage-compartment wide column of media storage compartments with a media drive in each of the columns. In this arrangement, for purposes of addressing, each media drive can be addressed as if it is one of the storage compartments. The accessing mechanism moves relative to the length of each library column. The media accessing compartments are respectively aligned for relative movement with respect to respective library columns such that the movement along the columns by the accessing mechanism moves all of the accessing compartments only along respective ones of the library columns.

A further aspect on the invention provides for linearly offsetting location of the media accessing compartments and the media storage compartments in the respective libraries. Relatively positioning the accessing mechanism for accessing a media storage compartment in one library position all other media accessing compartments offset from the media storage compartments in all other ones of the libraries such that only one record medium is fetched or stored at one time. Multiple record media may be contained in the accessing mechanism. The above-mentioned offset control determines which library is to be accessed. In this manner, library accessing can be dynamically interleaved for minimizing relative travel between the accessing mechanism and the media libraries.

In yet another aspect of the invention, a common actuator on the accessing mechanism simultaneously actuates all record-medium fetching-storing apparatus in the respective media accessing compartments. Using the compartment offset, one and only one record medium is transferred at a time.

The foregoing and other objects, features and advantages of the invention will be apparent from the following more particular description of preferred embodiments of the invention, as illustrated in the accompanying drawings.

DESCRIPTION OF THE DRAWING

FIG. 2 diagrammatically illustrates columnar offsets of record media compartments of two record media libraries shown in FIG. 1.

FIG. 3 is a simplified cut-away perspective of an accessing mechanism showing a fetching apparatus of the Fig. illustrated embodiment.

FIG. 4 is a simplified showing of a record medium usable in the FIG. 1 illustrated embodiment.

Figure 1:
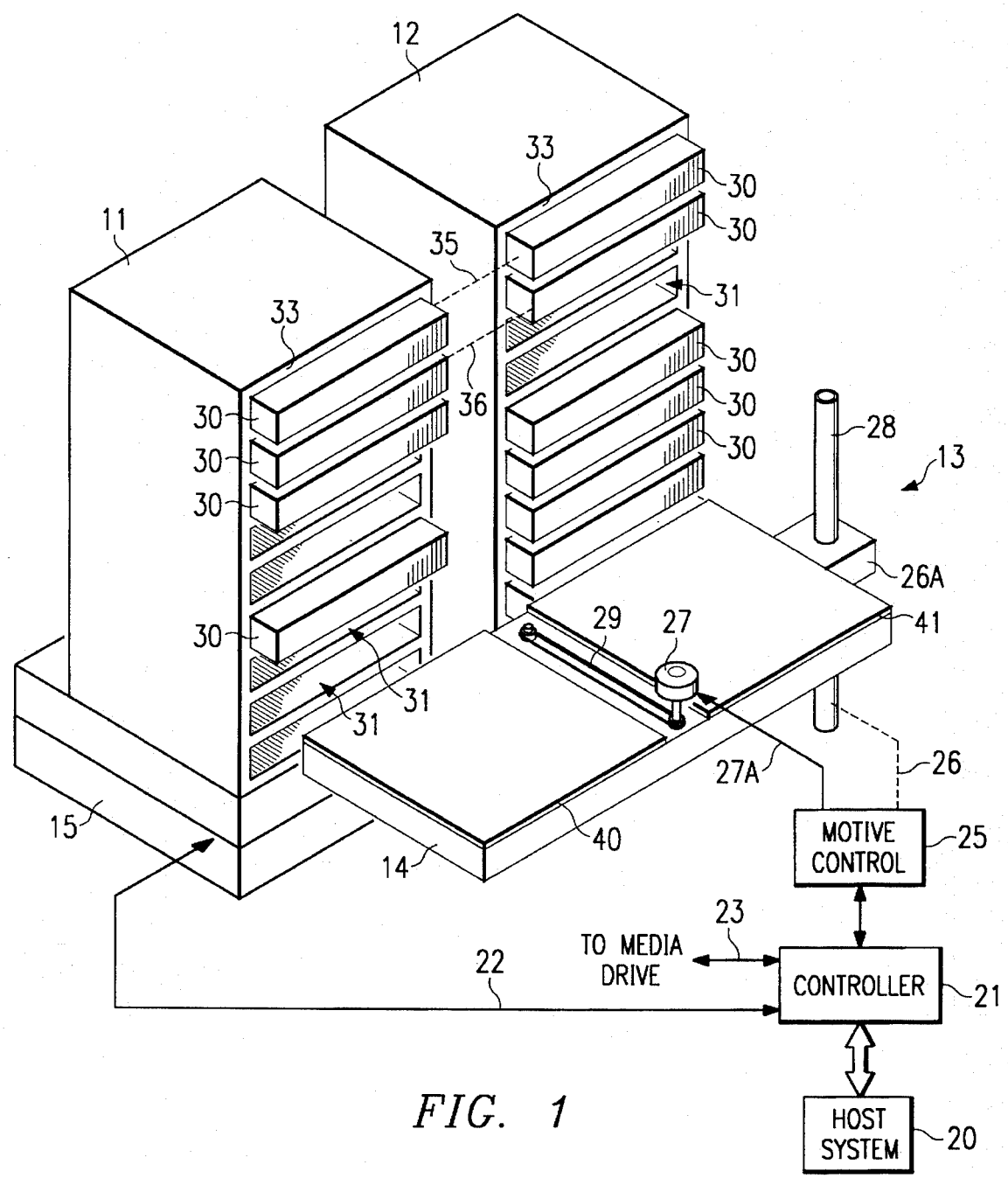
FIG. 1 illustrates an embodiment of the invention is a simplified block diagram form.

FIG's 8 and 9 are simplified diagrammatic illustrations of an alternate arrangement to the FIG. 1 illustrated embodiment.

FIG's 10 and 11 are simplified machine operation flow charts showing fetching and storing record media in any of the illustrated embodiments.

DETAILED DESCRIPTION

Referring now more particularly to the appended drawing, like numerals indicate like parts and structural features in the various figures. Two record media libraries 11 and 12 stand in a side-by-side vertical columnar relationship. Record media accessing mechanism 13 has record media accessing module 14, movably mounted on pole 28, is relatively movably disposed for movement along the lengths of libraries 11 and 12. Pole 28 may have anti-rotation arrangement, such as a key way and key (not shown). Each library 11 and 12 has a record media device 15 disposed at one columnar end of the respective libraries (device 15 for library 11 is not seen in FIG. 1). Each record media device 15 has an access opening facing accessing mechanism 13 for transferring record media 30 (shown as cartridge contained optical disk media) between a record medium storage compartment 31 and a media device 15. Since the relative motion of accessing module 14 is linear, as will become apparent, only that record media stored in one of the record media libraries is transferrable to a record media device 15 in such record media library. In one embodiment, optical disk cartridges are stored in both libraries 11 and 12. In other embodiments, library 11 stores optical disk cartridges while library 12 stores magnetic disk cartridges. In yet other embodiments, either library may store magnetic tape cartridges, optical disks, magnetic disks and the like.

Control and use of the libraries 11 and 12 are effected by a host system 20 programmed in a usual manner for operating a plurality of record media libraries. Controller 21 provides for the usual peripheral controls and data transfers for a record media library. Lines 22 and 23 respectively connect controller 21 to record media devices 15. Motive control 15 is connected to controller 21 for responding to positioning requests to actuate accessing mechanism 13 to move accessing module 14 along vertical support pole 28 longitudinally of columnar libraries 11 and 12. Dashed line 26 represents a motive control 25 controlled motor and cables (not separately shown) that move accessing module 14 pursuant to commands generated in and issued by controller 21. Alternately, boss 26A may contain a motor, connected to motive control 25, with a cog gear that engages a rack on pole 28 for moving accessing module relative to libraries 11 and 12.

Motive control 25 also actuates accessing motor 27 via line 27A for actuating a later-described record media fetching apparatus via belt 29. Such fetching apparatus stores or fetches, one record medium 30 at a time, record media to and from respective ones of record media storage compartments 31 in either one of the libraries 11 and 12. The depth of media storage compartments 31 is less than the length of a stored record medium 30 such that each record medium extends outwardly of its respective record medium storage compartment 31, all as represented in FIG. 1 by numeral 33. Such extension of each record medium 30 combined with columnar offsetting of record medium storage compartments enables simplifying construction and operation of accessing module 14. Such storage compartment offsetting is shown by dashed lines 35 and 36 (FIG. 1). An upper boundary of a top-stored record medium 30 in library 12 is vertically aligned with a mid-point of a top-stored record medium in library 11.

This arrangement is such that if accessing module 40 is aligned to fetch or store a cartridge in one of the libraries 11 or 12, then accessing module 40 is aligned with a space between record medium storage compartments as later described and best seen in FIG. 2.

Figure 7:
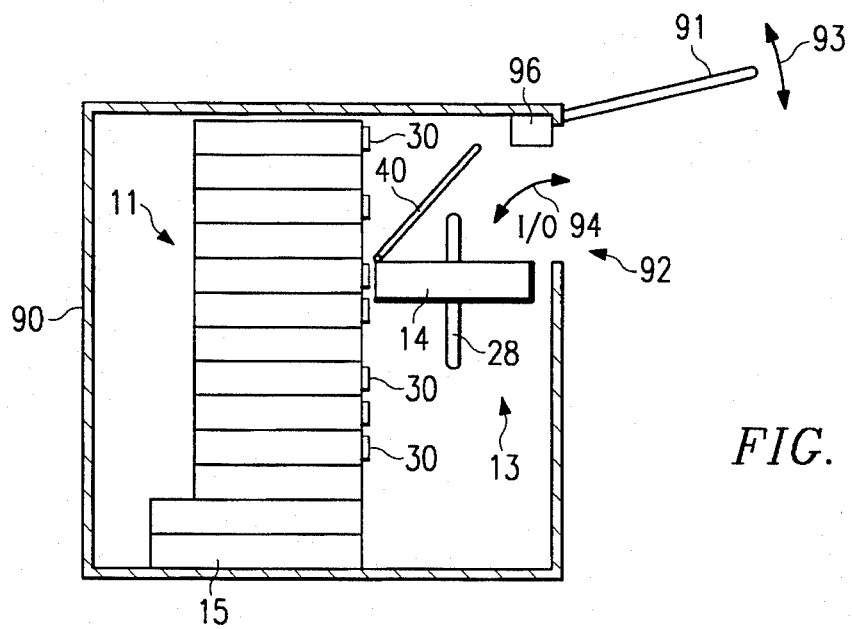
FIG. 7 diagrammatically illustrates an input-output operation of the FIG. 1 illustrated accessing mechanism.

Accessing mechanism 13 also provides for record media input and output respectively for libraries 11 and 12. Accessing module has two record media transfer compartments 50 and 51 (FIG. 3) for respectively accessing record media 30 in libraries 11 and 12. Media transfer compartments 50 and 51 respectively have input-output (IO) access closures 40 and 41. As best seen in FIG. 7, housing 90 encloses libraries 11 and 12 with accessing mechanism 13. Housing 90 has IO closure 91 that is openable as indicated by double-headed arrow 93. While accessing module 14 is in the FIG. 7 illustrated IO position, fetching apparatus 55(FIG. 5) is retracted, motive control 25 has turned off power to accessing mechanism 13, IO closure 40 may be pivoted to the open position shown in FIG. 7. A record medium is then manually inserted through housing 90 opening 92 as indicated by double-headed arrow into 94 one of the two transfer compartments 50 and 51 for respectively inserting a record medium 30 into libraries 11 and 12 respectively. Only one record medium may be input or output from each accessing module at a given time. Output, removal or ejection of record media 30 is handled in a reverse process. An interlock switch 96 mounted on housing 90 responds to closure 91 opening to break a power circuit to accessing mechanism for preventing movement of accessing module 14 and actuation of fetching apparatus 55.

Referring again to FIG. 2, the columnar offsets and operation of accessing module 14 fetching apparatus 55 are described. The FIG. 2 view is looking at the libraries from accessing module 14. Remember that the stored record media protrude outwardly of the record medium storage compartments in both libraries 11 and 12. Fetching apparatus 55 moves into a space 47 in front of line 33 (FIG. 3) between adjacent ones of the protruding record media. All spaces 47 are between adjacent record media 30 adjacent line 33. The actual sequence of accessing is described later with respect to FIG's 9 and 10. In FIG. 2, inter-compartment spaces 47 enable accessing record media, one at a time, in either one of the libraries.

First, accessing a record medium 30 in library 11 requires that accessing module be aligned as indicated by dashed line 45. In this alignment, fetching apparatus 55 (FIG. 3) is disposed above a record medium in library 11 that is to be fetched. The fetching includes first extending, as later described, fetching apparatus to be vertically positioned at dashed line 45 over a record medium (or its vacant storage compartment) in each of the libraries 11 and 12. The library 11 record medium is closer to line 45 that the record medium in library 12. Lowering accessing module 14 a short distance as indicated by arrows 46 enables the fetching apparatus 55 to engage the library 11 record medium while the fetching apparatus 55 remains in a space 47 in library 12 avoiding engaging any record medium therein.

Similarly, for fetching a record medium in library 12, accessing module is initially positioned at a line 48 at a space 47 that is below a record medium of library 12 to be fetched. After extending fetching apparatus (FIG. 3) into the space 47 aligned with line 48, accessing module 14 moves upwardly as indicated by arrows 49 to engage a record medium in library 12 for moving it to accessing module 14. This arrows 49 indicated upward movement in library 11 remains entirely within space 47 before the closest record medium so no engagement is made by fetching apparatus 55 with a record medium in library 11. Retraction of fetching apparatus 55 into accessing module retrieves only the library 12 stored record medium into accessing module 14. Storing record media into libraries 11 and 12 follow a similar procedure as detailed with respect to FIG. 10. It is seen from all of the above, that each access space created between adjacent record media in front of the storage compartment modules or libraries 11 and 12 having horizontal overlap as represented by dashed lines 45 and 48.

Referring now more particularly to FIG. 3, fetching apparatus 55 is disposed in accessing module 14 between record medium transfer compartments 50 and 51. Fetching apparatus 55 includes a pair of record medium engaging pins 52 and 53, respectively for engaging record media in libraries 11 and 12. Spaced-apart stationary guide rails 56 guide pin block 57 between a retracted position at the closed end of module 14 and an extended position at the open end (shown in FIG. 5) of accessing module 14. Tie 58 extends between pin block 57 and drive belt 29. As motor 27 moves belt 29, pin block 57 and its engaging pins 52 and 53 are moved between the retracted and extended positions. Engagement and disengagement to and from record media is by vertical movement of accessing module 14 while fetching apparatus 55 is in the extended position. Such extending position always locates engaging pins 52 and 53 spaced from the open face wall of libraries 11 and 12 outwardly of the front end of the wall at line 33.

Figure 5:
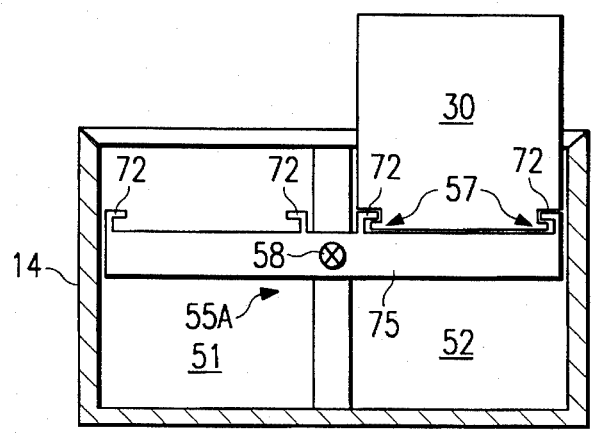
FIG. 5 is a simplified showing of a record-media fetching apparatus usable in the FIG. 1 illustrated embodiment.

FIG. 4 illustrates a record medium (optical disk in a cartridge) having engaging pins 60 disposed next to and forming engaging slot 61. Pins 60 enable pines 52/53 to move into and engage record medium 30 with closer spacing between record medium than required for the FIG. 3 illustrated record media. Otherwise, operations are as described above. In an alternate fetching apparatus, pins 52/53 are replaced by pin 60 receiving slotted arms (not shown) wherein the arms move over pin 60 for receiving pin 60 into the slotted arms (not shown). The sequence of fetching and storing is the same as for the FIG. 5 illustrated apparatus. The illustrated cartridge picking apparatus is exemplary. Any suitable media picking apparatus may be employed while practicing the present invention.

FIG. 5 illustrates, in diagrammatic plan view, alternate fetching apparatus 55A. Tie 58 ties crossbar 75 to be moved with belt 29 (see FIG. 3). Pairs of spaced-apart hooks 72 on crossbar 75 engage a record medium 30 on both sides of the record medium. Fetching and storing follows the same sequence as for the above-described embodiments and as shown in flow chart form in FIG's 10 and 11.

Figure 6:
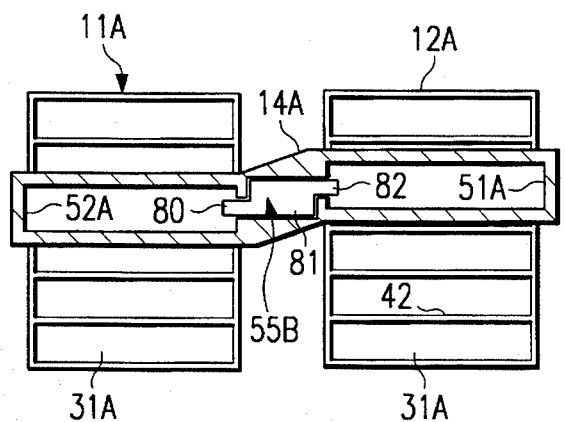
FIG. 6 diagrammatically illustrates offset record media accessing compartments of an accessing mechanism shown in FIG. 1.

FIG. 6 illustrates another fetching apparatus 55B in an alternate accessing module 14A having columnar offset record-medium engaging pins 80 and 82 on member 81. Using these offset pins enable all of the record medium storage compartments 31 to be aligned. Columnar offset transfer compartments 51A and 52A enable fetching but one record medium in libraries 11A and 12A having aligned compartments 31A. As illustrated in FIG. 6, pin 82 is positioned along the column of compartments 31A of library 12A to be between adjacent ones of the record medium storing compartments, hence will not engage any record medium. Engaging pin 80 is disposed just above a record medium 31A in a record medium storage compartment 31A aligned with transfer compartment 51A. Lowering accessing module 14A engages pin 80 with a record member to be fetched while pin 82 engages no record medium. Operation is the same as described for the FIG. 3 illustrated apparatus and as set forth in the FIG's 10–11 flow charts, i.e. the above-described record medium engaging motion of accessing module 14 is upward in one library and downward in the other library.

Figure 8:
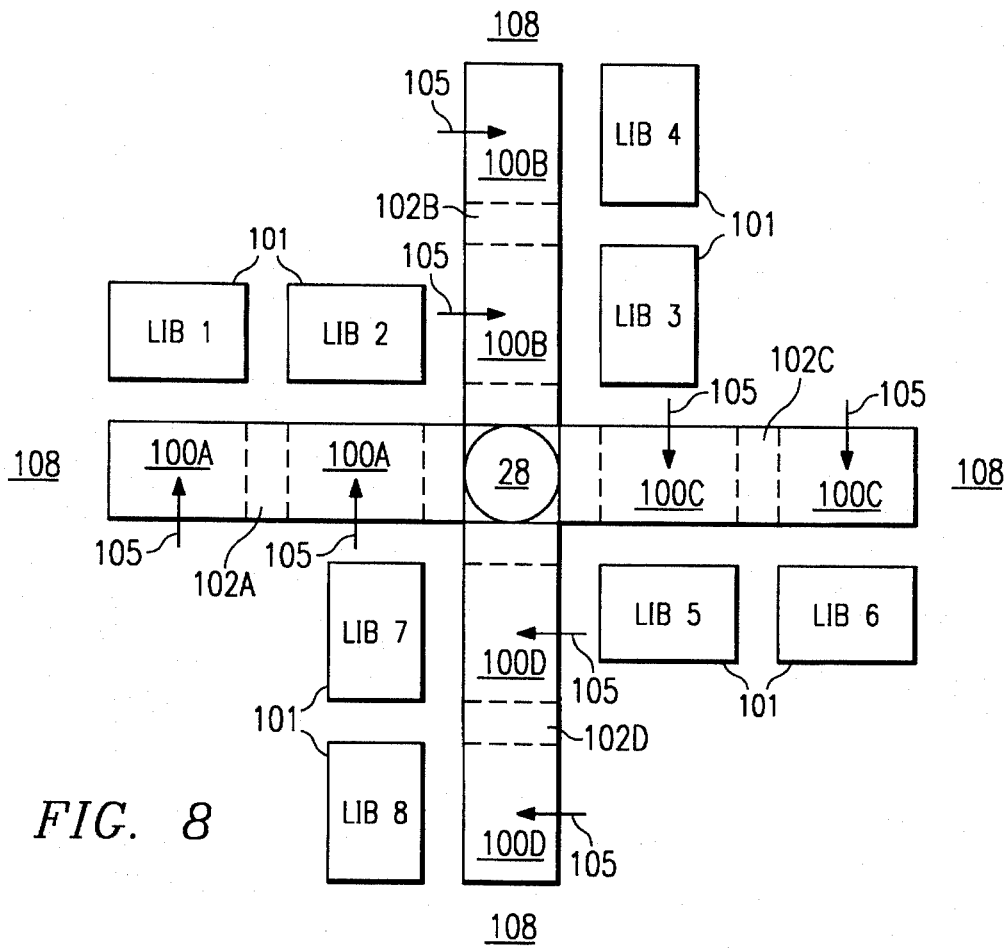

FIG's 8 and 9 diagrammatically illustrate a four and an eight record medium library arrangement in which the present invention is advantageously practiced by providing but one accessing mechanism for all of the independent libraries. In an eight library arrangement, four accessing modules 100A-D are provided on pole 28. The eight libraries 101, labeled LIB 1 through LIB 8 are disposed about the axis (not shown) of pole 28. A separate fetching apparatus 102A-D is provided in each of the accessing modules 100A-D. Each fetching apparatus 102A-D operates as described for the FIG's 1–7 illustrated embodiment. Record medium 30 IO to all eight libraries 101 is indicated by arrows 105. In this regard, note that access to a transfer compartment in accessing modules is through a top wall (not shown in FIG. 8) of housing 90 rather than through a side wall as seen in FIG. 7.

Figure 9:
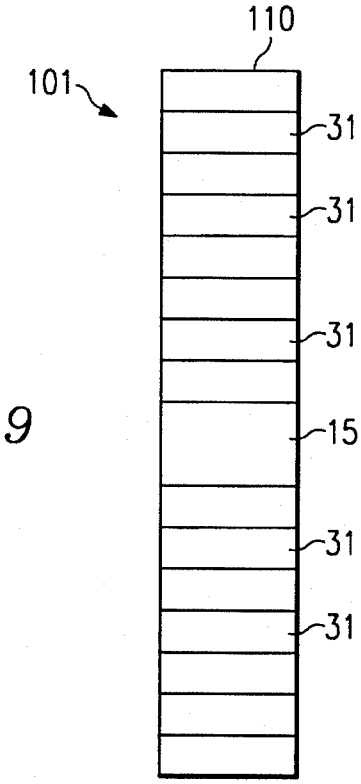

A four library arrangement can use at least two different arrangements. One arrangement follows a similar "X" arrangement excepting that each accessing module 100A-D has but one transfer compartment that faces radially outwardly. Four single columnar libraries 108 are disposed radially outward of the four single-compartment accessing modules. In this arrangement record medium IO is as shown in FIG. 7. Another four library arrangement consists accessing modules 100A and 100C and LIB 1, LIB 2, LIB 5 and LIB 6 for example. The libraries LIB 5 and 6 can be positioned on the same side pole 28 as LIB's 1 and 2 so as to be aligned with LIB's 1 and 2. A six library arrangement is envisioned as having three pairs of libraries (as shown in FIG. 1) disposed in a "Y" about pole 28. Other arrangements are readily envisioned based upon the inventive principles of this invention. As seen in FIG. 9, a library 101 may consist of vertical array 110 having compartments 31 with a media device 215 disposed at a vertical center point.

FIG's 10 and 11 are simplified machine operation charts respectively setting forth a sequence of machine operations for fetching and storing record media in accordance with one aspect of this invention. The description is made for accessing record media in library 11. It is to be understood that reversing the direction of motion of accessing module for engagement or disengagement with record media makes this description equally applicable to library 12 operations. Also refer to FIG. 3 for seeing the relationships of fetching apparatus 55 to a record medium stored in libraries 11 and 12. The library 11 record medium is to be fetched while the library 12 record medium is to be ignored. Step 120 moves accessing module 14 to a vertical position 119 just above the record medium to be fetched from library 11 but aligned with the access opening (FIG. 1) of the library 12 record medium storage compartment from which the record medium is to be fetched (line 45 of FIG. 2). At the completion of step 120, the fetching apparatus 55 engaging pins 52, 53 (FIG. 3) are disposed respectively aligned with one access opening at line 45 of FIG. 2 and above an access opening in library 12 that is an upper area of space 47 (FIG. 2). Then, step 121 extends fetching apparatus 55 toward the libraries 11 and 12. At the completion of step 121, engaging pin 52 is aligned with and is above a slot 59 of the library 11 record medium to be fetched. The library 11 record medium to be fetched is now ready to be gripped for being moved to transfer compartment 50. Similarly for accessing a cartridge from library 12, holder 14 is disposed at vertical position 124 is above a storage compartment in library 11.

Step 122 lowers accessing module 14 for moving engaging pin 52 into a slot 59 of the library 11 record medium to be fetched. Also, engaging pin 53 is moved from the upper portion of space 47 to a lower portion of space 47 as indicated by an arrow 46 of FIG. 2. Then, step 123 retracts fetching apparatus 55 into accessing module 14 for pulling the gripped library 11 record medium into transfer compartment 50.

FIG. 11 shows the steps for moving the fetched record medium to either a media drive 15 of library 11 or a record medium storage compartment of library 11, hereinafter target access opening. Step 125 moves accessing module 14 for alignment with target access opening in library 11. At the completion of step 125, the fetched record medium is aligned (vertically centered) at the target access opening. Engaging pin 53 in library 12 is vertically positioned at a lower or bottom portion of a space 47, i.e., at the lower tip of arrow 46 in library 12 (FIG. 2). Step 126 then extends fetching apparatus 55 for inserting the fetched record medium carried in transfer compartment 50 into the target access opening. After completion of step 126, step 127 raises accessing module 14 such that engaging pin 53 is free of the fetched cartridge in library 11 while engaging pin 53 is in an upper portion of a space 47 in library 11 (at line 45 of FIG. 2). Then, step 128 retracts fetching apparatus into accessing module 14. This action leaves the fetched cartridge in the target access opening. The operation described above for library 11 also applies to a storing operation for library 12 with the sole change that the accessing module is lowered to release the stored record medium rather than raised as described for library 11.

While the invention has been particularly shown and described with reference to preferred embodiments thereof, it will be understood by those skilled in the art that various changes in form and details may be made therein without departing from the spirit and scope of the invention.

What is claimed is:

1. An automatic media storing and handling apparatus, including in combination:

a first plurality of physically-juxtaposed storage-compartment modules, said physically-juxtaposed storage-compartment modules each having a plurality of record-medium storage compartments disposed in a linear array for storing a plurality of record media, respectively;

said record-medium storage compartments respectively having first access openings that open in a first direction through which said record media may be respectively inserted into and fetched from said record-medium storage compartments, all of said first access openings opening to a same side in the respective physically-juxtaposed storage-compartment modules;

a plurality of media drives, said media drives being in a predetermined one of said record-medium storage compartments in each one of said storage-compartment modules, respectively;

each of said media drives having a second access opening that opens in said first direction;

a single accessing mechanism movably disposed with respect to said storage compartment modules for relative movement across said first and second access openings for aligning said single accessing mechanism with one of said first or second access openings for transferring any one of said record media through said one of said first or second access openings;

an accessing module in said accessing mechanism being movable with said accessing mechanism across said first and second access openings for alignment with said one of said first and second access openings for transferring a predetermined one of said record media to and from one of said record-medium storage compartments and said media drives;

said accessing module having a second plurality, equal to said first plurality, of medium-carrying compartments;

said medium-carrying compartments respectively having media transfer openings facing said first and second access openings, respectively, said medium-carrying compartments being mounted for movement with said accessing module such that each of said medium-carrying compartments only accesses said record-medium storage compartments and said media drives in a respective one of said storage-compartment modules;

fetching means in each of said medium-carrying compartments for moving a predetermined one of said storage media between a predetermined one of said medium-storage compartments and said medium-carrying compartments, respectively;

motive means connected to said accessing mechanism and to said fetching means for actuating said accessing mechanism to move said accessing module to respectively align a predetermined one of said medium-carrying compartments with a predetermined one of said first and second access openings for actuating a predetermined one of said fetching means for transferring said predetermined one of said record media between said single accessing mechanism and a predetermined one of said storage-compartment modules and media drives;

said storage-compartment modules each being a single-compartment wide column of said record medium storage compartments, said media drives having said second access openings respectively in said columns of said record medium storage compartments;

said accessing module having a respective one of said medium-carrying compartments aligned with said columns such that movement of said accessing module across said first and second access openings is a reciprocation along a length of all of said columns, respectively;

said record-medium storage compartments in a first predetermined one of said storage-compartment modules being offset along the length of said columns from storage compartments in a second predetermined one of said storage-compartment modules;

spacers disposed between adjacent ones of said record-medium storage compartments in each of said columns, said spacers having an extent along the length of said columns such that first predetermined respective portions of said spacers in said first one of said storage-compartment modules are aligned with respective second predetermined portions of said spacers in said second one of said storage-compartment modules, said record media in said record-medium storage compartments extending outwardly from the respected storage compartments for creating access spaces having an extent equal to said extent of said spacers, respectively, between said record media stored in adjacent storage compartments in said first and second storage-compartment modules;

said medium-carrying compartments being movable to first and second positions with respect to a first predetermined one of said record-medium storage compartments in said first predetermined one of said storage compartment modules to respectively simultaneously align in said first position said first predetermined one of said medium-carrying compartments with a first one of said first predetermined respective portion and in said second portion align said first predetermined one of said medium-carrying compartments with said first predetermined storage compartment of said first predetermined one of said storage-compartment modules; and extending-retracting means in said accessing module and connected to said fetching apparatus in said first predetermined one of said medium-carrying compartments for extending said fetching apparatus along said first predetermined one of said storage-compartment modules such that in said first position said fetching apparatus extends into one of said access spaces and aligned is with said first one of said first predetermined respective portions and in said second position extends into said first predetermined one of said record-medium storage of compartments respectively for enabling retrieving and storing a predetermined record medium from or to said first predetermined one of said record-medium storage compartments in said first predetermined one of said storage-compartment modules.

2. Apparatus set forth in claim 1, further including in combination:

said motive means connected to said extending-retracting means for responding to said extending of said fetching apparatus for relatively moving, as an ending movement, said accessing module along said column from said first position to align said first one of said medium-carrying compartments with said predetermined one of said record-medium storage compartments in said first one of said storage-compartment modules for engaging said fetching apparatus with said record medium in said predetermined one of said record-medium storage compartments in said first one of said storage compartment modules and from said second position to free said fetching means from said record medium in said first predetermined storage compartment in said first predetermined one of said storage-compartment modules; and said extending-retracting means after said ending movement retracting said fetching means into said first one of said medium-carrying compartments.

3. Apparatus set forth in claim 2, further including in combination:

each of said medium-carrying compartments having an openable closure; and said accessing means having an input-output position along said first and second storage-compartment modules at which a given one of said record media may be inserted into a predetermined one of said medium-carrying compartments for inserting a record medium into a predetermined one of said storage-compartment modules and a predetermined one of said record media may be removed from said predetermined one of said medium-carrying compartments for ejecting said predetermined one of said record media from said predetermined one of said storage-compartment modules.

4. Apparatus set forth in claim 1, further including in combination:

said extending-retracting means being connected to said fetching apparatus in both of said medium-carrying components for simultaneous movements toward and away from said storage-compartment modules, respectively; and said ending movements moving a second predetermined one of said fetching apparatus along a second predetermined one of said storage-compartment modules entirely within a predetermined one of said access spaces of said second predetermined one of said storage-compartment modules.

5. Apparatus set forth in claim 1, further including in combination:

said first plurality of said storage compartment modules being 2N of said storage compartment modules, N being a positive integer greater than zero; and said 2N storage-compartment modules being grouped into pairs of two each of said storage-compartment modules, each said pair of said storage-compartment modules having a separate one of said accessing modules.

6. An automatic media storing and handling apparatus, including in combination:

a first plurality of physically-juxtaposed storage-compartment modules, said physically-juxtaposed storage-compartment module each having a plurality of record-medium storage compartments disposed in a linear array for storing a plurality of record media, respectively;

said recorded-medium storage compartments respectively having first access openings that open in a first direction through with said record media may be respectively inserted into a fetched from said record-medium storage compartments, all of said first access openings opening to a same side in the respective physically-juxtaposed storage-compartment modules;

a plurality of media drives, said media drives being in a predetermined one of said record-medium storage compartments in each one of said storage-compartment modules, respectively;

each of said media drives having a second access opening that opens in said first direction;

a single accessing mechanism movably disposed with respect to said storage compartment modules for relative movement across said first and second access openings for aligning said single accessing mechanism with one of said first or second access openings for transferring any one of said record media through said one of said first or second access openings;

an accessing module in said accessing mechanism being movable with said accessing mechanism across said first and second access openings for alignment with said one of said first and second access openings for transferring a predetermined one of said record media to and from one of said record-medium storage compartments and said media drives;

said accessing module having a second plurality, equal to said first plurality, of medium-carrying compartments;

said medium-carrying compartments respectively having media transfer openings facing said first and second access openings, respectively, said medium-carrying compartments being mounted for movement with said accessing module such that each of said medium-carrying compartments only accesses said record-medium storage compartments and said media drives in a respective one of said storage-compartment modules;

fetching means in each of said medium-carrying compartments for moving a predetermined one of said storage media between a predetermined one of said medium-storage compartments and said medium-carrying compartments, respectively;

motive means connected to said accessing mechanism and to said fetching means for actuating said accessing mechanism to move said accessing module to respectively align a predetermined one of said medium-carrying compartments with a predetermined one of said first and second access openings for actuating a predetermined one of said fetching means for transferring said predetermined one of said record media between said single accessing mechanism and a predetermined one of said storage-compartment modules and media drives;

said storage-compartment modules each being a single-compartment wide column of said record medium storage compartments, said media drives having said second access openings respectively in said columns of said record medium storage compartments;

said accessing module having a respective one of said medium-carrying compartments aligned with said columns such that movement of said accessing module across said first and second access openings is a reciprocation along a length of all of said columns, respectively;

spacers between adjacent ones of said record-medium storage compartments in each of said columns, said spacers each having a predetermined extent along the length of said columns;

one of said medium-carrying compartments being offset along the length of one of said columns from one of said storage compartments such that while one of said medium-carrying compartments is aligned with a first predetermined storage compartment in a first one of said storage-compartment modules, a second predetermined one of said medium-carrying compartments is not aligned with any one of said record-medium storage compartments in a second predetermined one of said storage-compartment modules;

said medium-carrying compartments being movable to first and second positions with respect to a first predetermined one of said record-medium storage compartments in said first predetermined one of said storage-compartment modules to respectively simultaneously align in said first position said first predetermined ones of said medium-carrying compartments with one of said spacers in said first predetermined one of said storage-compartment modules and in said second position aligning said first predetermined one of said medium-carrying compartments with a first predetermined storage compartment of said first predetermined one of said storage-compartment modules and aligning said second predetermined one of said medium-carrying compartments with said one of said spacers in said second predetermined one of said storage-compartment modules; and extending-retracting means in said accessing module and connected to said fetching apparatus in said first predetermined one of said medium-carrying compartments for extending said fetching apparatus along said first predetermined one of said storage-compartment modules such that in said first position said fetching apparatus extends into one of said spacers and aligns with said one spacer and in said second position extends into said first predetermined one of said record-medium storage compartments respectively for enabling retrieving and storing a predetermined record medium from or to said first predetermined one of said record-medium storage compartment in said first predetermined one of said storage-compartment modules.

7. Apparatus set forth in claim 6, further including in combination:

each of said medium-carrying compartments having an openable closure; and said accessing means having an input-output position along said first and second ones of said storage-compartment modules at which a given one of said record media may be inserted into a predetermined one of said medium-carrying compartments for inserting said first given one of said record media in a predetermined one of said storage-compartment models and a second given one of said record media may be removed from said predetermined one of said medium-carrying compartments for ejecting said second given one of said record media from said predetermined one of said storage-compartment modules.

8. Apparatus set forth in claim 6, further including in combination:

said extending-retracting means being connected to said fetching apparatus in both of said medium-carrying components for simultaneous movements toward and away from said storage-compartment modules, respectively; and an ending movements moving a second predetermined one of said fetching apparatus along a second predetermined one of said storage compartment modules entirely within a predetermined one of said spacers of said second predetermined one of said storage-compartment modules.

9. Data storage media apparatus including, in combination:

a storage array having first and second storage-compartment modules, each said storage-compartment module having a linear array of medium-storage compartments and a media drive, each said medium-stoarage compartment and drive having an access opening facing outwardly of one side of the respective storage-compartment modules, said media drive being a given one of said storage compartments, said storage compartments in said linear array being in side-by-side columns of said storage compartments, respectively, in said first and second modules;

accessing means movably disposed in juxtaposition to said modules for simultaneous relative movement along said one side of all of said storage-compartment modules, said accessing means having a medium carrier disposed for said simultaneous relative movement along said one side of all of said storage-compartment modules;

said medium carrier having first and second side-by-side medium-carrying compartments, said first and second medium-carrying compartments each having a medium transfer opening facing and aligned, respectively, with said one side of said first and second storage-compartment modules, respectively, and being stationarily mounted on said medium carrier for movement with said medium carrier such that said medium-carrying compartments move along a respective one of said first and second storage-compartment modules;

control means connected to said accessing means for actuating said accessing means to move said medium carrier for simultaneously positioning all of said medium-carrying compartments with respect to said storage-compartment modules, respectively, such that transfers of predetermined ones of said record media between respective ones of said storage compartments in respective ones of said storage-compartment modules and said medium-carrying compartments are enabled;

said medium-carrying compartments being a certain set of said compartments;

side-by-side ones of said compartments in a first predetermined one of said sets being offset along the length of said columns from each other;

spacers between adjacent ones of said storage compartments in each of said columns, said spacers having a given extent along the length of said columns, said record media in said storage compartments extending outwardly from the respected storage compartments for creating access spaces respectively equal to said given extents, respectively, between record media stored in adjacent ones of said storage compartments in first and second ones of said storage-compartment modules;

motive means connected to said medium-carrying compartments for moving said medium-carrying compartments to first and second positions with respect to a first predetermined one of said storage compartments in said first predetermined one of said storage compartment modules to respectively simultaneously align in said first position said first predetermined one of said medium-carrying compartments with one of said spacers and in said second position align said first predetermined one of said medium-carrying compartments with said first predetermined storage compartment of said first predetermined one of said storage-compartment modules; and extending-retracting means in said accessing module and having a fetching apparatus in said medium-carrying compartments for extending said fetching apparatus toward said first predetermined one of said storage-compartment modules such that in said first position said fetching apparatus extends into one of said access spaces and is aligned with a first one of said spacers and in said second position extends into said first predetermined one of said storage compartments respectively for enabling retrieving and storing a predetermined record medium from or to said first predetermined one of said record-medium storage compartments in said first predetermined one of said storage-compartment modules.

10. Apparatus set forth in claim 9, further including in combination:

fetching apparatus in each of said medium-carrying compartments;

extending-retracting means connected to said fetching apparatus of said first predetermined one of said medium carrying compartments for movement from within said first predetermined one of said medium-carrying compartments toward and away from said storage array;

said motive means connected to said extending-retracting means for responding to said extending of said fetching apparatus for relatively moving as an ending movement of said accessing module along said column from said first position to align said first one of said medium-carrying compartments with said predetermined on of said storage compartments in said first one of said storage-compartment modules for engaging said fetching apparatus with said record medium in said predetermined one of said storage compartments in said first one of said storage compartment modules and from said second position to free said fetching means from said record medium in said first predetermined storage compartment in said first predetermined one of said storage-compartment modules; and said extending-retracting means after said ending movement, retracting said fetching means into said first one of said medium-carrying compartments.

11. Apparatus set forth in claim 10, further including in combination:

said medium-carrying compartments having respective openable closures; and said accessing means having an input-output position along said first and second storage-compartment modules at which a given one of said record media may be inserted into a predetermined one of said medium-carrying compartments and a predetermined one of said record media may be manually removed from said predetermined one of said medium-carrying compartments through an opened one of said openable closures for ejecting said predetermined one of said record media from said predetermined one of said storage-compartment modules.

12. Apparatus set forth in claim 10, further including in combination:

said extending-retracting means being connected to said fetching apparatus in said first and second medium-carrying compartments for simultaneous movements toward and away from said storage-compartment modules, respectively; and said ending movements moving a second predetermined one of said fetching apparatus along a second predetermined one of said storage compartment modules entirely within a predetermined one of said access spaces of said second predetermined one of said storage-compartment modules.

13. A method of retrieving and storing record media into and from a storage array having a first plurality of storage-compartment modules, each said storage-compartment module having a linear array of medium-storage compartments and a media drive, each said medium-storage compartment and drive having an access opening facing outwardly of one side of the respective storage-compartment modules, said media drive being a given one of said storage compartments, said storage compartments in said storage array being in side-by-side columns of said storage compartments, respectively in said first and second modules such that said storage compartments in said first and second ones of said storage-compartment arrays are side-by-side, accessing means movably disposed in juxtaposition to said modules for simultaneous relative movements along said one side of all of said storage-compartment modules, said accessing means having a medium carrier disposed for said simultaneous relative movement along said one side of all of said storage-compartment modules, said medium carrier having a second plurality, equal to said first plurality, of side-by-side medium carrying compartments, each one of said medium-carrying compartments being for accessing said record media in respective ones of said storage-compartment modules, said medium-carrying compartments having a medium transfer opening facing and aligned, respectively, with said one side of respective ones of said storage-compartment modules and being stationarily mounted on said medium carrier for movement with said medium carrier such that each of said medium-carrying compartments moves along one of said storage-compartment modules;

the method including the steps of:

relatively moving said accessing means in a given direction such that said medium-carrying compartments face and move along only a respective one of said storage-compartment modules;

for transferring one of said record media between one of said storage compartments and a respective one of said medium-carrying compartments, moving said medium carrier to first and second positions with respect to a first predetermined one of said storage compartments in said first predetermined one of said storage compartment modules to respectively simultaneously align in said first position said first predetermined one of said medium-carrying compartments with said first predetermined storage compartment and in said second position align said second predetermined one of said medium-carrying compartments with a second predetermined storage compartment of said second predetermined one of said storage-compartment modules;

moving a fetching apparatus in said first predetermined one of said medium-carrying compartments toward said first predetermined one of said storage-compartment modules such that in said first position said fetching apparatus extends into said a first predetermined one of said storage compartments and in said second position extends into said second predetermined one of said storage compartments, respectively;

providing a plurality of spaces disposed along said first direction between said storage compartments for creating an access space between each an everyone of said storage compartments;

making said storage compartments shorter than said record media such that said record media stored in said storage compartments, respectively, extend outwardly toward said accessing means such that said accessing space extends to a distal end of each of said storage media stored in said array; and making said side-by-side compartments offset in said given direction such that when one of said side-by-side medium-carrying compartments is aligned with one of said storage compartments then a second one of said side-by-side medium-carrying compartments is aligned with one of said access spaces.

14. The method set forth in claim 13, further including steps of:

in said moving said fetching apparatus step, simultaneously moving said fetching apparatus in each and every one of said medium-carrying compartments toward said storage array.

15. The method set forth in claim 7, further including steps of:

inserting a given one of said record media that is outside of said apparatus directly into one of said medium-carrying compartments;

moving said one medium carrying compartment to a given one of said storage compartments; then moving said given one of said record media into said given one of said storage compartments;

moving a certain one of said record media from one of said storage compartments into a second one of said medium carrying compartments; and removing said certain one of said record media from said second one of said medium carrying compartments to be outside of said apparatus whereby record media are inserted into and ejected from said storage apparatus via said accessing module.

* * * * *